United States Patent

[11] 3,559,692

| [72] | Inventor | Jean Mantelet |
| | | Paris, France |
| [21] | Appl. No. | 720,680 |
| [22] | Filed | Apr. 11, 1968 |
| [45] | Patented | Feb. 2, 1971 |
| [73] | Assignee | Moulinex S. A. |
| | | Bagnolet, France |
| [32] | Priority | Apr. 20, 1967 |
| [33] | | France |
| [31] | | P.V.103,453 |

[54] FLEXIBLE TUBES
5 Claims, 7 Drawing Figs.

[52] U.S. Cl. .................................................... 138/121,
138/178
[51] Int. Cl. ....................................................... F16l 11/06
[50] Field of Search ........................................... 138/121,
122, 177(Cursory), 178(Cursory)

[56] References Cited
UNITED STATES PATENTS

| 2,073,335 | 3/1937 | Connell ........................ | 138/122 |
| 2,622,623 | 12/1952 | Michaudet .................... | 138/122 |
| 2,876,801 | 3/1959 | November ..................... | 138/121 |
| 3,050,087 | 8/1962 | Caplan .......................... | 138/122X |
| 3,201,111 | 8/1965 | Afton ............................ | 138/121X |
| 3,234,969 | 2/1966 | DuMont ........................ | 138/121 |
| 3,313,319 | 4/1967 | Osborn .......................... | 138/121 |
| 3,330,303 | 7/1967 | Fochler ......................... | 138/121 |

*Primary Examiner*—Herbert F. Ross
*Attorney*—Young and Thompson

ABSTRACT: A flexible tube having a wall of wavy section each wave having successive folds opening inwardly and outwardly, the crest of at least one of the folds of each wave having a narrowly concave outline.

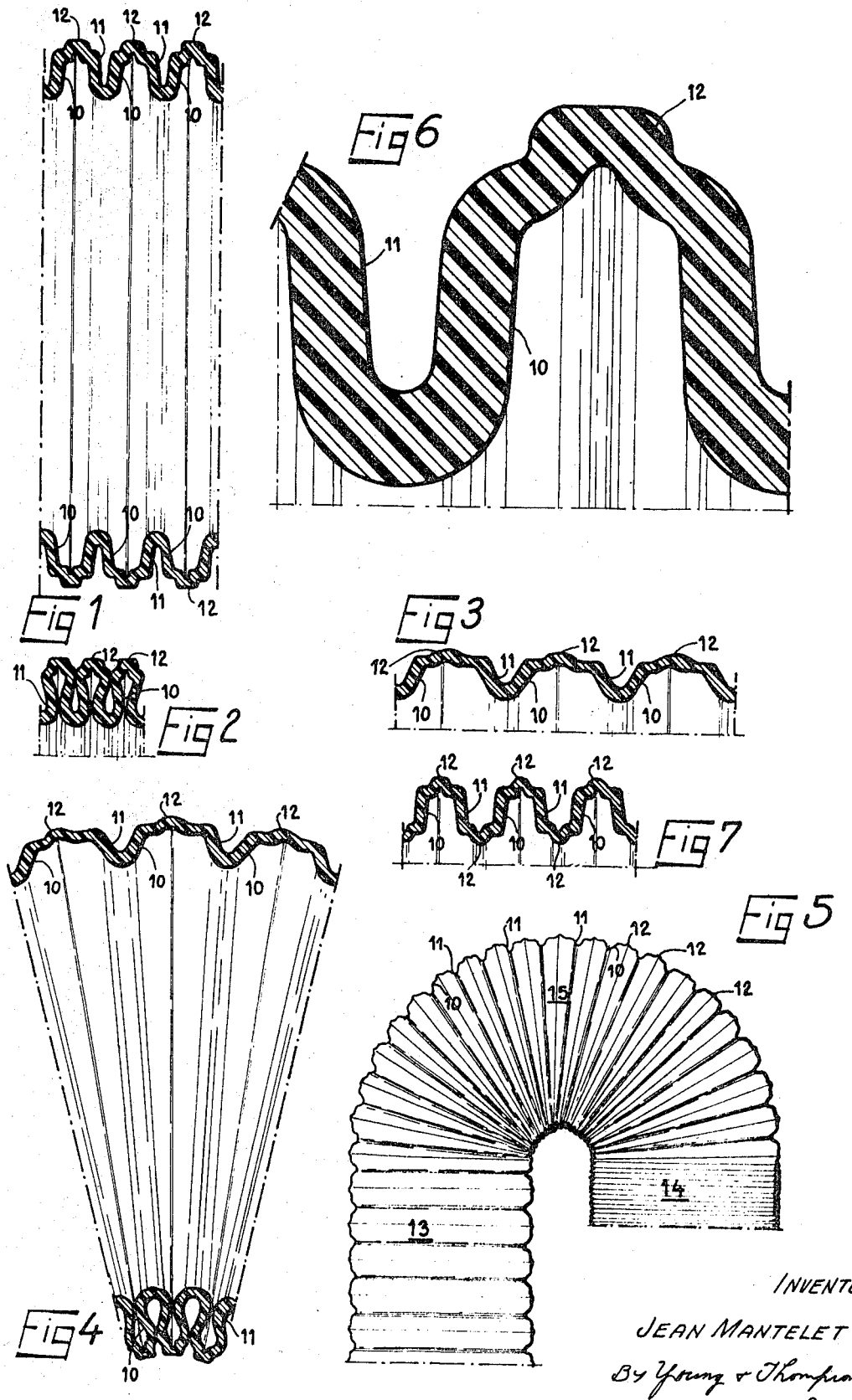

FLEXIBLE TUBES

BACKGROUND OF THE INVENTION

1. Field of the Invention

This invention relates to the flexible tubes wholly made of pliable material such as a plastic material, and intended to convey a fluid such as air.

2. Description of the Prior Art

The invention more specifically relates to the tubes of this kind whose wall, in longitudinal section, has a sinuous or wavy outline having the form of a series of identical waves, each comprising a fold opening to the inside of the tube, followed by a fold opening towards the outside.

The main object of the present invention is to provide a tube of this nature which can stretch and contract in substantial degree, and above all can bend along a small radius of curvature without causing any buckling, that is to say without excessive reduction in the passage cross section of the tube at the bending point.

SUMMARY

According to the present invention a flexible tube made wholly of pliable material such as a plastic material for conveying a fluid such as air, has a wall which in longitudinal section comprises a series of identical waves, each having a fold opening towards the inside of the tube followed by a fold opening towards the outside, the crest of at least one of the said folds of each wave itself having a narrowly corrugated outline.

Thus each fold whose crest has narrow corrugations has a greater tendency to open or close under application of the forces acting thereon. It follows that the tube has great flexibility as well as great extensibility and contractability

BRIEF DESCRIPTION OF THE DRAWINGS

In order that the invention may be more fully understood some constructions in accordance therewith will now be described by way of example with reference to the accompanying drawings, in which:

FIG. 1 is a longitudinal section of a tube portion in the idle condition;

FIG. 2 is a partial longitudinal section of the tube of FIG. 1 in the contracted position;

FIG. 3 is a view similar to FIG. 2 with the tube in the stretched condition;

FIG. 4 is a section of a portion of the tube of FIGS. 1 to 3 in the bent condition;

FIG. 5 shows on a reduced-scale view the outside of a portion of the tube of FIGS. 1 to 4, of which a part is stretched, another bent, and yet another is contracted;

FIG. 6 is an enlarged-scale view in section of a small area of the wall of the tube of the preceding FIGS.; and FIG. 7 is a view similar to FIG. 1 of a variant.

DESCRIPTION OF THE PREFERRED EMBODIMENT

The flexible tube shown is made wholly of plastic material, for example of ethylene vinyl acetate. In longitudinal section, its wall has a sinuous or wavy outline having the form of a series of identical waves, each comprising a relatively wide fold 10 opening towards the inside of the tube, followed by a narrower fold 11 opening towards the outside.

Each fold 10 has a narrow corrugation 12 at its crest having the general shape of a U or of a V which, like the fold 10, opens towards the inside of the tube.

In the area of the supercorrugated fold 10, the wall thickness of the tube is smaller than in the area of the fold 11, as seen in FIG. 6.

Due to this thinning of the wall, and primarily to the corrugation 12, each fold 10 has a great tendency to open (FIG. 3) or to close (FIG. 2) under action of the forces applied to it so that the tube itself has great stretchability and contractability, as seen respectively, in the parts 13 and 14 of FIG. 5.

It follows equally that the tube may be bent along a small radius of curvature without causing squashing or buckling, that is to say without appreciable reduction in the passage section of the tube at the bending point. This is shown in FIG. 4 and equally in part 15 of FIG. 5.

As shown in FIG. 7, provision may be made for the crests of both folds of each wave to have a super corrugation.

As for itself, this super corrugation may assume other forms than that shown.

It will be noted that tubes of the invention may be employed, in particular, for domestic vacuum cleaners, for which they will be particularly appropriate due to their great flexibility, light weight and low cost price.

I claim:

1. A flexible tube made wholly of pliable material such as a plastic material, for conveying a fluid such as air, the wall of which in longitudinal section comprises a series of identical waves each having a fold opening toward the inside of the tube followed by a fold opening toward the outside, the apex of at least one of the said folds itself having further narrow central corrugation defined by a protrusion and a groove and opening in the same direction as its respective fold and forming on each of the inside and outside faces of the wall of the tube two inflexion points symmetrically disposed on opposite sides of said apex.

2. A flexible tube according to claim 1, wherein only the fold opening toward the inside of the tube has said narrow corrugation at its apex.

3. A flexible tube according to claim 2 wherein the fold opening toward the inside is wider in a direction axially of the tube than the fold opening toward the outside.

4. A flexible tube according to claim 2 wherein the wall thickness is smaller in the fold opening toward the inside of the tube than in the fold opening toward the outside.

5. A flexible tube according to claim 3 wherein the wall thickness is smaller in the fold opening toward the inside of the tube than in the fold opening toward the outside.